Jan. 4, 1949.    R. J. MESSINA ET AL    2,458,186
DEVELOPING CAMERA
Filed July 2, 1947    2 Sheets-Sheet 2
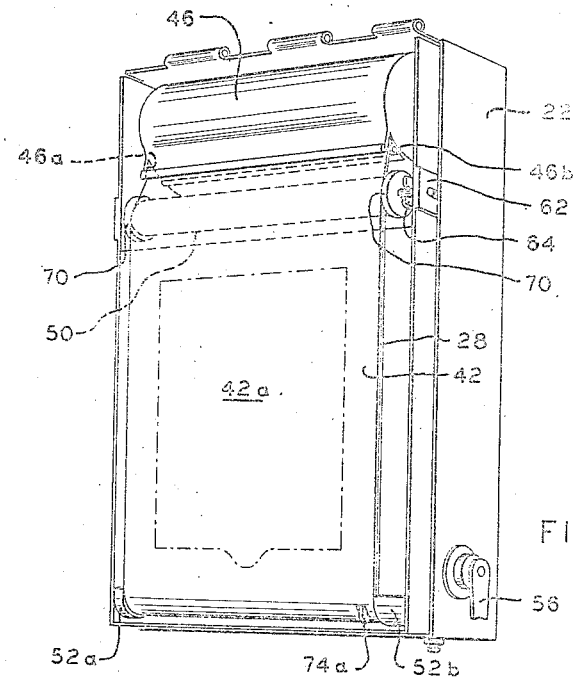
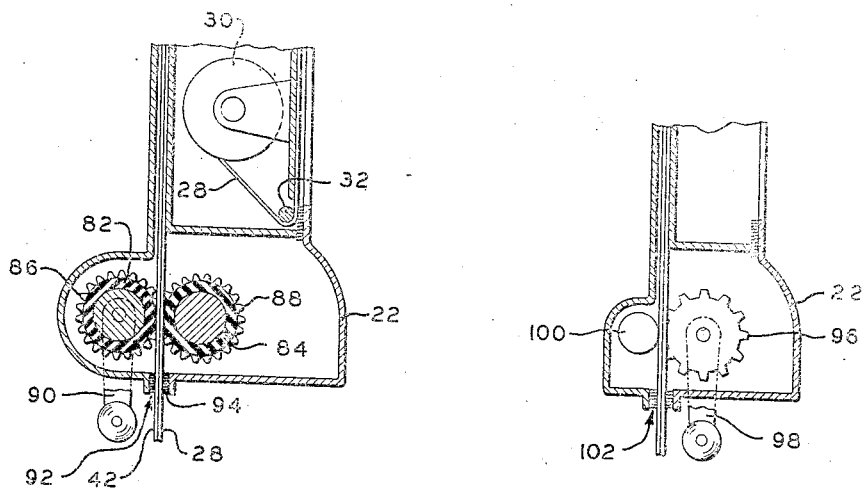

Patented Jan. 4, 1949

2,458,186

UNITED STATES PATENT OFFICE 2,458,186

DEVELOPING CAMERA

Rosario J. Messina, West Roxbury, and Otto E. Wolff, Cambridge, Mass., assignors to Polaroid Corporation, Cambridge, Mass., a corporation of Delaware Application July 2, 1947, Serial No. 758,652

13 Claims. (Cl. 95—13)

1

This invention relates to photographic apparatus and more particularly to a camera for processing film material which has been photographically exposed.

An object of the invention is to provide an apparatus having one or more elements for subjecting sheet materials to compression and means separate from the compressing elements for advancing the materials.

Another object of the invention is to provide an apparatus having means adapted to advance a film material to the focal plane, to advance the film from the focal plane between a pair of elements for compressing the film, and to advance the film a predetermined distance and in a predetermined direction beyond the compressing elements.

A further object of the invention is to provide an apparatus having separate sheet-advancing and sheet-compressing means of the aforesaid type, the apparatus being adapted to advance a film to exposure position, to advance and compress the exposed film and another sheet material between the compressing elements, and to advance both materials in superposed relation from the compressing elements to another predetermined position.

Still another object is to provide an element for advancing the materials between compressing members, the element serving to take up and store surplus or waste materials involved in processing the film.

Other objects are to provide the aforesaid elements in a camera of suitable design and to provide a combination of separate advancing and compressing elements appropriate thereto.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is a rear view of the camera of Fig. 1;

Fig. 3 is a fragmentary view of a modification of the advancing means of Fig. 1; and

2

Figure 1:
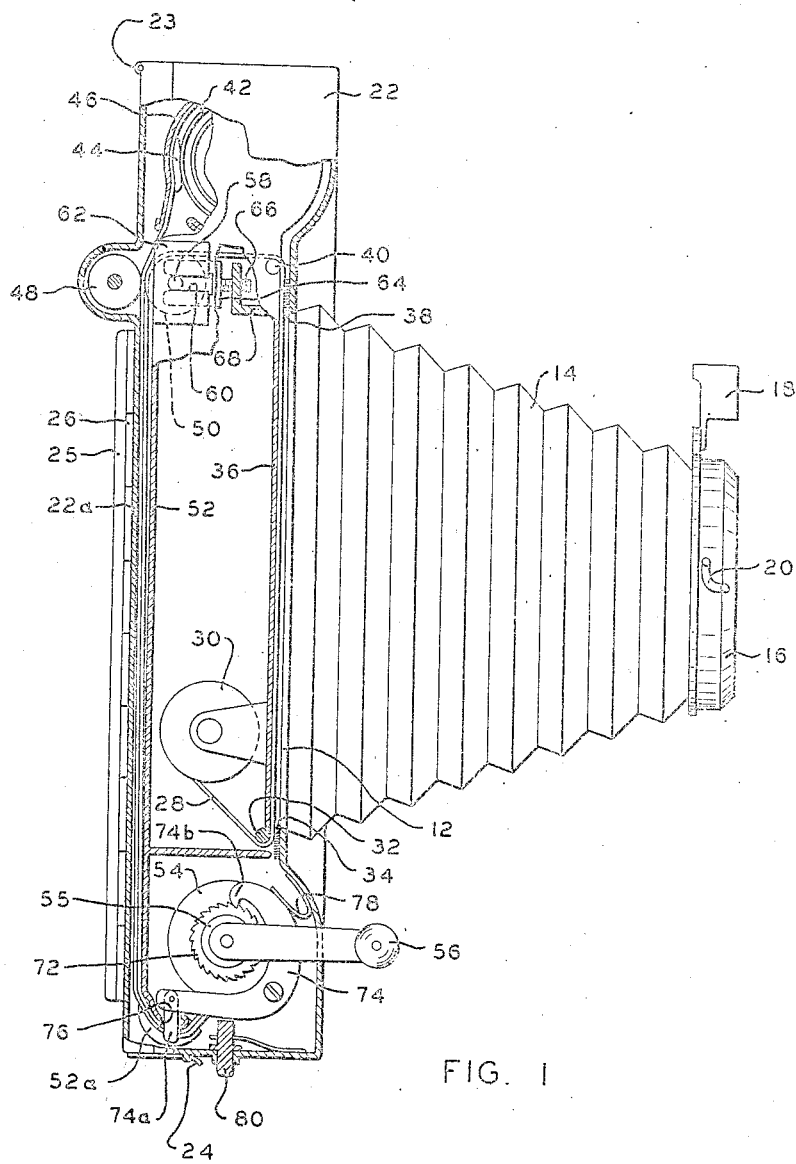
Figure 1 is a schematic elevation view, partly in cross section and with parts broken away, of one form of camera apparatus of the invention.

Fig. 4 is a fragmentary view of a further modification of the advancing means of Fig. 1.

The photographic apparatus of the invention is adapted to perform a plurality of operations upon materials comprising a photosensitive roll film, a roll of another sheet material such as a paper which is preferably opaque and of width similar to the film, and a plurality of collapsible fluid-bearing containers preferably mounted at predetermined intervals upon a surface of the last-named material. Each of the fluid containers releasably carries a quantity of film-processing fluid adapted to be spread over an exposed area of film when said film and surface of sheet material bearing the fluid containers are progressively subjected to compression.

In carrying out the above-described operations the apparatus is particularly adapted to perform a process whereby there is provided a positive photographic print upon or within one of the materials. In such a process, a preferred film comprises a silver halide emulsion as its photosensitive layer and a preferred processing fluid includes a viscous, aqueous, alkaline solution of a developer and a silver halide solvent. When a photographically exposed film and a paper material are positioned closely adjacent one another and a given quantity of film-processing fluid of the aforesaid type has been spread between and is simultaneously in contact with facing surfaces of both materials, the fluid enables formation on the paper of a positive image of the subject matter of a latent negative image within the exposed photosensitive layer of the film. The processing fluid may, however, include only a solvent for the reactive substances or the paper material may be adapted only to developing, or developing and fixing, a latent negative image in a silver halide photosensitive layer. It is also possible to accomplish a predetermined processing of other photosensitive materials such as diazonium compounds, bichromates, or ferric salts through apparatus of the invention. Various suitable materials for the above-mentioned preferred and other processes are described in the copending application of Edwin H. Land. Serial No. 729,578, filed February 19, 1947, for Photograghic process and apparatus.

Referring to Fig. 1 in which a hand-held camera is schematically shown partly in cross section, conventional elements for photographically exposing a light-sensitive film material are provided, namely, framing plate 12, bellows 14, lens 16, view finder 18, and shutter release 20. A camera casing 22 is provided, it being assumed that said casing includes suitable pivotally mounted or otherwise releasably secured portions adapted to mounting of elements of the apparatus and to threading of materials therewithin. It will be noted that the entire rear casing portion 22a is pivoted about hinge 23 and is secured by latch means 24. Casing portion 22a includes a door 25 pivotally secured thereto by hinge 26, the function of said door being that of providing access to sheet materials within the camera after treatment thereof, as will presently be described.

A photosensitive film material 28 is supplied from a spool 30, said spool preferably being positioned behind the focal plane to shorten the distance of travel of said film to exposure position and to reduce the overall length of the camera. Elements for guiding the film to and from exposure position and for positioning the film in the focal plane comprise guide 32, light-shielding strip 34, supporting plate 36, framing plate 12, light-shielding strip 38, and guide 40. A roll of another sheet material 42, such as a paper material having a plurality of fluid containers 44 mounted upon surface portions thereof which are adapted to be advanced to facing relation with the film, is preferably supplied from a cartridge 46 which may be removably mounted in the camera. While the paper could be wound upon a spool, cartridge 46 having no core provides a preferred mounting means wherein a loose roll of said paper may be coiled without compression of the fluid containers mounted thereon.

A pair of pressure-applying members 48 and 50 are suitably mounted for ready feeding thereto both of film 28, after its exposure, and paper 42, said members 48 and 50, cartridge 46, and the point of egress of said film from exposure position between backing plate 36 and framing plate 12 accordingly being in close proximity to one another. Film 28 and paper 42 are passed between compressing members 48 and 50 in superposed relation to one another, the exposed surface of film and surface of paper material which bears said fluid containers being positioned in face-to-face adjacent relation by said members. After being compressed between said members 48 and 50, the film and paper are positioned within a narrow light-tight chamber formed by casing portion 22a and web 52. Extremities of the superposed and compressed materials are threaded in the slot of a take-up spool 54, said spool being releasably mounted in the camera and actuated, for example, by a hand-crank 56. The take-up spool provides individual advancement of the exposed portion of film 28 and the corresponding portion of paper 42 to pressure-applying members 48 and 50, advancement of said materials between said pressure-applying members, and further advancement within said light-tight chamber.

Members 48 and 50 may appropriately be in the form of a pair of pressure rollers, said rollers being, for example, either biased toward contact with one another or permanently spaced apart by a predetermined amount according to the compressive qualities required. In a preferred construction shown, said members comprise a pair of metal rollers formed, for example, of stainless steel. Shaft 58 of roller 50 is slidably mounted at either end in a slot 60 formed in a supporting member 62. A flat type of spring 64 comprising angularly extending portions at each end thereof which bear upon roller shaft 58 is tensioned to provide bias of pressure roller 50 toward pressure roller 48. Means for varying tension of spring 64 may be provided by an adjusting screw 66 threaded through a fixed portion of the camera, such as angle member 68, and bearing upon said spring. A pair of flanges 70 (Fig. 2) formed at each extremity of pressure roller 50 engages the surface of pressure roller 48 and provides a predetermined minimum spacing between pressure-applying surfaces of the rollers. The preferred tension of spring 64 is such that pressure roller 50 yields slightly to allow portions of film 28 and paper 42 having fluid container 44 positioned therebetween to be advanced between the rollers. The tension of spring 64 is sufficient, however, for causing collapse of the fluid container and expulsion of its fluid contents during advancement of the materials and, after release of the fluid from the container; said tension is adapted to resist hydraulic separative forces involved in spreading the fluid and to maintain the pressure rollers at the aforesaid minimum spacing for evenly spreading the fluid between the materials within a wide range of operational speeds at which the materials may be advanced between members 48 and 50. Inasmuch as pressure roller 48 is mounted upon pivotal casing portion 22a it will be seen that when said portion 22a is swung open, threading of the materials between rollers 48 and 50 is easily accomplished and when said casing portion is closed and held by latch 24, pressure rollers 48 and 50 are placed in the above-described operational position.

Take-up spool 54 is removably mounted at each extremity upon bearing means 55, said spool being keyed to bearing means having hand-crank 56 attached thereto. Take-up spool 54 provides means for advancing the film and paper as above described and also serves to hold any surplus or waste portions of film, paper or fluid in excess of those which are to be retained in or adjacent image-carrying portions of the materials. It will be understood that when the materials are threaded in the apparatus, leaders thereof are so positioned with respect to one another and are of such relative length as to insure that the first fluid container will be positioned immediately in advance of the first exposed area of film while passing between pressure-applying means 48 and 50. The fluid containers are so spaced apart as to insure that each succeeding container will be similarly positioned relative to succeeding exposed areas of film. Accordingly, when the materials are advanced between the compressive members the fluid is released to the exposed area of the film. To avoid jerkiness of operation and thereby to facilitate a continuous smooth advancement of the materials during spreading of the fluid without danger of advancing the materials too little or too far, a limit stop device is preferably associated with the advancing means. A suitable form of limit stop shown comprises a ratchet 72 rigidly attached to bearing means 55. A pivotal pawl-like member 74 comprises an extremity 74a adapted to be passed through an aperture 76 in web 52 and enter superposed perforations in the film and paper and an extremity 74b adapted to engage ratchet 72 and thereby terminate rotation of take-up means 54. Pawl-like member 74 is biased for pivotal movement enabling the aforesaid functional movement of extremities 74a and 74b by a spring 78.

A plurality of superposed perforations in the materials are so spaced along the surfaces thereof as to insure that movement of said materials is stopped when the trailing edge of each exposed area of film has passed between compressive members 48 and 50, at which stage the compressed materials are held within the aforesaid chamber formed by camera portions 22a and 52 and a succeeding area of film is positioned for exposure in the focal plane. A release button 80 is provided for actuating pivotal member 74 to simultaneously release extremities 74a and 74b from contact with the materials and ratchet, respectively, so that succeeding lengths of the materials may be advanced, exposed, and processed.

Means are provided to insure movement of the materials between the compressive means in superposed relation, said means comprising guide portions widely spaced apart as shown in Fig. 2, namely, portions 46a and 46b of cartridge 46 and portions 52a and 52b of web 52. The aforesaid guide means serve to prevent sidewise slippage of film and paper materials having a processing fluid therebetween during advancement of said materials between compressive means 48 and 50.

Door 25 pivotally secured to casing 22a by a hinge 26 and having suitable latch means (not shown) enables access to the compressed materials when positioned in the aforesaid light-tight chamber. It may be desirable to hold said materials in releasably bonded relation unexposed to actinic light for a brief period during which the processing fluid is allowed to complete its function, said light-tight chamber serving as a depository for the purpose. After completion of the processing operation, door 25 may be opened and a portion or portions of the materials to be retained may be removed. Fig. 2 assumes that casing 22a including door 25 and pressure roller 48 have been broken away revealing paper 42 in superposed compressed relation to film 28. The construction of paper material shown, namely, the partially perforated area 42a thereof, is suitable for the formation of a positive photographic print upon the inner surface of said area of paper which faces the film. After door 25 is opened, area 42a may be lifted from remaining portions of the materials, said remaining portions, comprising marginal remnants of the paper, the entire film, and any excess of the processing fluid, being subsequently wound upon take-up spool 54.

In Figs. 3 and 4 alternate means for advancing the film and paper materials are shown, said means being positioned within a portion of the camera casing generally similar to that occupied by take-up spool 54 in Fig. 1 and being adapted to association with other elements of Fig. 1, omitting door 25. Referring to Fig. 3 a pair of feed rollers 82 and 84 surfaced with rubber or a similar frictional material are shown, said rollers being driven by gears 86 and 88 and a handcrank 90. The feed rollers may, for example, engage the entire outer surfaces of the materials or marginal portions of said outer surfaces only. Knurled feed rollers of metal or another nonyielding composition would also be suitable for the purpose. After passing between the rollers, film 28 and paper 42 are propelled from the camera through aperture 92 having light-shielding strips 94 adjacent thereto, areas of the materials thus advanced through aperture 92 being adapted to severance from remaining lengths of the materials. Fig. 4 shows a sprocket 96 adapted to engage film and paper of a type having, for example, superposed sprocket holes in marginal portions thereof or sprocket holes in one material which is caused to adhere to the other as, for example, by an adhesive coating extending along facing marginal portions of the materials, said sprocket being manually rotated by a handcrank 98. A pad roller 100 serves to maintain the materials in engagement with the sprocket, said materials being propelled through an aperture 102 where a portion of the materials carrying the photographic image may be severed from other portions and the film and paper may subsequently be stripped apart. Latch means 24 are not shown in the embodiments of Figs. 3 and 4, it being understood, however, that suitable latch means are provided.

Operation of the apparatus, in terms of the elements and viewing position of Fig. 1, is as follows. Leaders of film 28 and paper 42 are threaded through the apparatus as shown and attached to take-up spool 54. Extremity 74a of member 74 is positioned upon the marginal surface of film 28 and, accordingly, extremity 74b is caused to be spaced from ratchet 72. Handcrank 56 may then be rotated in a counterclockwise direction to take up and advance the materials until extremity 74a enters the first perforation in the materials and causes extremity 74b to engage ratchet 72, thus releasably locking the handcrank. At this stage of operation an area of film 28 is positioned in the focal plane for photographic exposure and a fluid container 44 is so positioned that, after exposure of the film and during advancement of the materials, it will be brought in contact with a portion of the film immediately in advance of the exposed area of the latter. After the film is photographically exposed, button 80 is briefly depressed, handcrank 56 is rotated in a counterclockwise direction, the materials are advanced, portions of the film and paper between which the fluid container is positioned are compressed between members 48 and 50, thus releasing the fluid between facing surfaces of the materials. Further advancement of the materials between members 48 and 50 causes the fluid to be spread throughout successive areas of the materials comprising at least the image area of film and an area of paper superposed therewith, after completion of which extremity 74a of member 74 enters a second perforation in the materials and movement thereof is temporarily halted, as above described. The compressed materials are maintained in the chamber formed between camera portions 22a and 52 for a predetermined period suitable, for example, for completing formation of a positive print, after which door 25 may be swung open and portion 42a of paper 42 bearing said positive print may be stripped from film 28 and removed from the apparatus.

Members 48 and 50 are termed compressing members, pressure rollers, and the like herein, it being obvious that member 48 provides a nonyielding surface against which the materials are compressed by spring-tensioned member 50. It will be apparent that either or both members may be spring tensioned for applying pressure to the sheet materials. Members 48 and 50 could moreover be in the form of a pair of nonrotatable, predeterminedly spaced members in which instance their operation would be substantially the same as that of the flanged pressure rollers shown. A window (not shown) for viewing indicia carried by paper 42 and thereby ascertaining the number and position of frames of film within the appartus may be mounted in door 25, said window comprising a suitable filter for preventing admittance of actinic light.

While the fluid containers are shown mounted upon material 42, said containers could be separately supplied and positioned between the film and paper, prior to compression thereof. With respect to the sheet-advancing means shown in Figs. 3 and 4, a further modification of the apparatus would permit mounting said advancing means and placing the aperture in the casing immediately adjacent compressing means 48 and 50. Said modification presupposes film material having an opaque base and an opaque sheet material which is compressed therewith and passed directly through the camera casing, said materials being manually stripped apart, exteriorly of the camera, after a predetermined processing period. Such a modification would eliminate the light-tight chamber specified in Fig. 1.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for subjecting a plurality of photographically exposed areas of a light-sensitive film material to a predetermined processing comprising, in combination, means for mounting a roll of said film material, means for separately mounting a roll of a sheet material, means providing a pair of compressing members adapted to have said film material and said sheet material advanced in superposed relation and compressed therebetween, said materials having a fluid container positioned therebetween, as the same are advanced between said compressing members, and means spaced from said compressing members along the path of travel of said superposed materials for engaging said materials to pull the same between said compressing members, said members acting in cooperation with said film and said sheet material to spread the contents of said container to a predetermined area of said film.

2. Apparatus for subjecting a plurality of photographically exposed areas of a light-sensitive film material to a predetermined processing comprising, in combination, means for mounting a roll of said film material, means for separately mounting a roll of a sheet material, means providing a pair of compressing members adapted to have said film material and said sheet material advanced in superposed relation and compressed therebetween, said materials having a fluid container positioned therebetween, as the same are advanced between said compressing members, means providing a light-tight chamber for receiving said film material and said sheet material after said materials are compressed, said last-named means having a closure member providing access to the interior of said chamber for removal of portions of said materials, and advancing means spaced from said compressing members along the path of travel of said superposed materials for engaging said materials to pull the same between said compressing members, said members acting in cooperation with said film and said sheet material to spread the contents of said container to a predetermined area of said film, said advancing means comprising a take-up roll upon which said film and such parts of said sheet material as are not previously detached are adapted to be wound.

3. Apparatus for subjecting a plurality of photographically exposed areas of a light-sensitive film material to a predetermined processing comprising, in combination, means for mounting a roll of said film material, means for separately mounting a roll of a sheet material carrying a plurality of collapsible fluid containers in spaced relation along a surface thereof, each container releasably holding a quantity of fluid for processing at least one of said exposed areas of film, means providing a pair of compressing members adapted to have said exposed areas of film and said surface of sheet material advanced to adjacent superposed relation and compressed therebetween, and advancing means spaced from said compressing members along the path of travel of said superposed materials for engaging said materials to pull the same between said compressing members, said advancing means being actuated independently of said compressing members, said members acting in cooperation with said film and said sheet material to spread the contents of each container to a predetermined area of said film.

4. Apparatus for subjecting a plurality of photographically exposed areas of a light-sensitive film material to a predetermined processing comprising, in combination, means for mounting a roll of said film material, means for separately mounting a roll of a sheet material carrying a plurality of collapsible fluid containers in spaced relation along a surface thereof, each container releasably holding a quantity of fluid for processing one of said exposed areas of film, means providing a pair of narrowly spaced compressing members adapted to have said exposed areas of film and said surface of sheet material advanced to adjacent superposed relation and compressed therebetween, means comprising a light-tight chamber adapted to receive said film material and sheet material after said materials are compressed, means associated with said chamber providing access thereto for removal of portions of said materials, and means for advancing said film and said sheet material between said compressing members and into said light-tight chamber after compression thereof, said advancing means being spaced from said compressing members along the path of travel of said superposed materials for engaging said materials to pull the same between said compressing members, said members acting in cooperation with said film and said sheet material to spread the contents of each container to a predetermined area of said film.

5. Apparatus for subjecting a plurality of photographically exposed areas of a light-sensitive film material to a predetermined processing comprising, in combination, means for mounting a roll of said film material, means for separately mounting a roll of a sheet material carrying a plurality of collapsible fluid containers, each container releasably holding a supply of fluid for processing a predetermined exposed area of said film, means providing a pair of narrowly spaced compressing members adapted to have said film and said sheet material advanced in superposed relation therebetween, means comprising a light-tight chamber having an entrance aperture leading thereinto at an extremity of said chamber adjacent said compressing members and an outlet aperture leading therefrom at an opposite extremity of said chamber, said chamber being of a length at least equal to that of said exposed area of film and adapted to hold said film and sheet material removed from actinic light after said materials are compressed, means associated with said chamber providing access thereto for removal of portions of said materials, and means located adjacent said outlet aperture for engaging and for advancing said film material and said sheet material between said compressing members, said members acting in cooperation with said film and said sheet material during movement of said superposed materials therebetween to spread the contents of each container to a predetermined area of said film.

6. Apparatus for subjecting a plurality of photographically exposed areas of a light-sensitive film material to a predetermined processing comprising, in combination, means for mounting a roll of said film material, means for separately mounting a roll of a sheet material carrying a plurality of collapsible fluid containers, each container releasably holding a quantity of fluid for processing one of said exposed areas of film, means providing a pair of narrowly spaced compressing members adapted to have said film and said sheet material advanced in superposed relation therebetween, means comprising a light-tight chamber having an entrance aperture leading thereinto at an extremity of said chamber adjacent said compressing members and an outlet aperture leading therefrom at an opposite extremity of said chamber, said chamber being of a length at least equal to that of said exposed area of film and adapted to hold said film and sheet material removed from actinic light after said materials are compressed, means associated with said chamber providing access thereto for removal of portions of said materials, and means adjacent an aperture of said chamber comprising a pair of feed rollers spaced from said compressing members and adapted to frictionally engage said film and sheet materials for advancing said film material and said sheet material between said compressing members, for advancing said materials within said light-tight chamber and for propelling said materials through said outlet aperture to a position exterior of said chamber, said members acting in cooperation with said film and said sheet material during movement of said superposed materials therebetween to spread the contents of each container to a predetermined area of said film.

7. Apparatus for subjecting a plurality of photographically exposed areas of a light-sensitive film material to a predetermined processing comprising, in combination, means for mounting a roll of said film material, means for separately mounting a roll of a sheet material carrying a plurality of collapsible fluid containers, each container releasably holding a quantity of fluid for processing one of said exposed areas of film, means providing a pair of narrowly spaced compressing members adapted to have said film and said sheet material advanced in superposed relation therebetween, means comprising a light-tight chamber having an entrance aperture leading thereinto at an extremity of said chamber adjacent said compressing members and an outlet aperture leading therefrom at an opposite extremity of said chamber, said chamber being of a length at least equal to that of said exposed area of film and adapted to hold said film and sheet material unexposed to actinic light after said materials are compressed, means associated with said chamber providing access thereto for removal of portions of said materials, and means comprising a sprocket adapted to engage said materials for advancing said film material and said sheet material between said compressing members and for advancing said materials within said light-tight chamber, said members acting in cooperation with said film and said sheet material during movement of said superposed materials therebetween to spread the contents of each container to a predetermined area of said film.

8. Apparatus for subjecting a plurality of photographically exposed areas of a light-sensitive film material to a predetermined processing comprising, in combination, means for mounting a roll of said film material and a roll of a sheet material carrying a plurality of collapsible fluid containers, each container releasably holding a quantity of fluid for processing one of said exposed areas of film, means providing a pair of narrowly spaced compressing members adapted to have said film and said sheet material advanced in superposed relation therebetween, means comprising a light-impervious pasageway comprising two narrowly spaced plate members between which said film and sheet material are adapted to be moved after compression thereof, said passageway having a length exceeding that of an exposed area of film, means associated with said passageway providing access thereto for removal of portions of said materials, advancing means spaced from said compressing members along the path of travel of said superposed materials by substantially the length of an exposed area of film for engaging said materials to pull the same between said compressing members, said advancing means being actuated independently of said compressing members, said members acting in cooperation with said film and said sheet material as said superposed materials are advanced therebetween to spread the contents of each container to a predetermined area of said film, and guide means engaging the edges of said materials comprising a pair of surfaces positioned adjacent said compressing members and another pair of surfaces positioned adjacent said advancing means, said guide means operating to effect guidance of said materials in a predetermined direction.

9. Camera apparatus for photographically exposing a light-sensitive roll film material and for subjecting a plurality of photographically exposed areas of said film material to a predetermined processing comprising, in combination, means for mounting a roll of said film material, means for photographically exposing said film material, means for separately mounting a roll of a sheet material carrying a plurality of collapsible fluid containers mounted in spaced relation along a surface thereof, each container releasably holding a quantity of fluid for processing one of said exposed areas of film, means providing a pair of compressing members adapted to have said exposed areas of film and said surface of sheet material advanced to adjacent superposed relation and compressed therebetween, and means spaced from said compressing members along the path of travel of said superposed materials by substantially the length of an exposed area of film for engaging said materials to pull the same between said compressing members, said advancing means being actuated independently of said compressing members, said members acting in cooperation with said film and said sheet material as said superposed materials are advanced therebetween to spread the contents of each container to a predetermined area of said film.

10. Camera apparatus for photographically exposing a light-sensitive film material and for subjecting said film material to a predetermined processing comprising, in combination, means for mounting said film material, means comprising an exposure chamber for exposing said film material, means for separately mounting a sheet material carrying a plurality of collapsible fluid containers in spaced relation, means comprising a pair of pressure members between which said film and sheet materials are adapted to be advanced in superposed relation and subjected to compression, means providing a second chamber into which the said superposed materials are advanced after compression, said second chamber being located behind said exposure chamber, means engaging said superposed materials to pull the same between said pressure members and into said second chamber, said last-named means being spaced from said pressure members by a distance at least as great as the length of film capable of exposure in said exposure chamber, said pressure members acting in cooperation with said film and sheet materials to spread the contents of each container throughout a predetermined area of said film, and means located externally of said camera apparatus for actuating said last-named means.

11. Camera apparatus for photographically exposing a light-sensitive film material and for subjecting said film material to a predetermined processing comprising, in combination, means for mounting a roll of said film material, means comprising an exposure chamber for exposing said film material, means for separately mounting a roll of sheet material carrying a plurality of collapsible fluid containers in spaced relation, means comprising a pair of pressure members between which said film and sheet materials are adapted to be advanced in superposed relation and subjected to compression, means providing a second chamber into which the said superposed materials are advanced after compression, said second chamber being located behind said exposure chamber, means engaging said superposed materials to pull the same between said pressure members and into said second chamber, said last-named means comprising a pair of friction rollers spaced from said pressure members by a distance at least as great as the length of film capable of exposure in said exposure chamber, said pressure members acting in cooperation with said film and sheet materials to spread the contents of each container throughout a predetermined area of said film, and means located externally of said camera apparatus for actuating said last-named means.

12. Camera apparatus for photographically exposing a light-sensitive film material and for subjecting said film material to a predetermined processing comprising, in combination, means for mounting a roll of said film material, means comprising an exposure chamber for exposing said film material, means for separately mounting a roll of sheet material carrying a plurality of collapsible fluid containers in spaced relation, means comprising a pair of pressure rollers between which said film and sheet materials are adapted to be advanced in superposed relation and subjected to compression, means providing a second chamber into which the said superposed materials are advanced after compression, said second chamber being located behind said exposure chamber, means engaging said superposed materials to pull the same between said pressure rollers and into said second chamber, said last-named means comprising a sprocket in engagement with said film and spaced from said pressure rollers by a distance at least as great as the length of film capable of exposure in said exposure chamber, said pressure rollers acting in cooperation with said film and sheet materials to spread the contents of each container throughout a predetermined area of said film, and means located externally of said camera apparatus for actuating said last-named means.

13. Camera apparatus for photographically exposing a light-sensitive film material and for subjecting said film material to a predetermined processing comprising, in combination, means for mounting a roll of said film material, means comprising an exposure chamber for exposing said film material, means for separately mounting a roll of sheet material carrying a plurality of collapsible fluid containers in spaced relation, means comprising a pair of pressure rollers between which said film and sheet materials are adapted to be advanced in superposed relation and subjected to compression, means providing a second chamber into which the said superposed materials are advanced after compression, said second chamber being located behind said exposure chamber, means engaging said superposed materials to pull the same between said pressure rollers and into said second chamber, said last-named means comprising a take-up roll upon which part at least of said materials may be wound after processing, said take-up roll being spaced from said pressure rollers by a distance at least as great as the length of film capable of exposure in said exposure chamber, said pressure rollers acting in cooperation with said film and sheet materials to spread the contents of each container throughout a predetermined area of said film, and means located externally of said camera apparatus for actuating said last-named means.

ROSARIO J. MESSINA.
OTTO E. WOLFF.

REFERENCES CITED

The following references are of record in the file of this patent:

UNITED STATES PATENTS

| Number | Name | Date |
|--------|------|------|
| 1,424,816 | Grillone | Aug. 8, 1922 |